United States Patent [19]

Miyanaga

[11] Patent Number: 4,635,737

[45] Date of Patent: Jan. 13, 1987

[54] UNDERCUTTING DRILL

[75] Inventor: Masaaki Miyanaga, Ashiya, Japan

[73] Assignee: Kabushiki Kaishi Miyanaga, Miki, Japan

[21] Appl. No.: 707,641

[22] Filed: Mar. 4, 1985

[30] Foreign Application Priority Data

Mar. 8, 1984 [JP] Japan .................. 59-045306
Sep. 7, 1984 [JP] Japan .................. 59-136571[U]

[51] Int. Cl.$^4$ .......................................... E21B 10/32
[52] U.S. Cl. ............................ 175/284; 175/286
[58] Field of Search ........................... 175/284–289, 175/291, 406; 82/1.2, 1.4, 1.5; 408/158, 159, 153

[56] References Cited

U.S. PATENT DOCUMENTS

| 756,590 | 4/1904 | Cornelius | 175/286 |
| 963,596 | 7/1910 | Lescure | 175/286 |
| 2,638,327 | 5/1953 | Baldwin | |
| 4,411,324 | 10/1983 | Liebig | 175/289 |
| 4,446,934 | 5/1984 | Müller | 175/286 |
| 4,502,554 | 3/1985 | Jones | 175/285 |

FOREIGN PATENT DOCUMENTS

| 2917611 | 11/1980 | Fed. Rep. of Germany . |
| 3111362 | 4/1982 | Fed. Rep. of Germany . |
| 3126472 | 1/1983 | Fed. Rep. of Germany . |
| 3206678 | 9/1983 | Fed. Rep. of Germany . |
| 2479051 | 5/1981 | France . |
| 614649 | 12/1979 | Switzerland . |
| 576871 | 4/1946 | United Kingdom . |
| 1561640 | 5/1980 | United Kingdom . |
| 2053042 | 2/1981 | United Kingdom . |

Primary Examiner—Stephen J. Novosad
Assistant Examiner—Thuy M. Bui
Attorney, Agent, or Firm—Marshall, O'Toole, Gerstein Murray & Bicknell

[57] ABSTRACT

This disclosure relates to a drill for forming an undercut cavity in a hole in concrete, for an anchor bolt. The drill has forward and rearward ends, and comprises a body having an axially extending bore forming a generally cylindrical wall, the bore being open adjacent said forward end. A wedge center is slidably mounted within the bore, and connecting means is fixed to said center and axially slidably engages the body so that the body and the center rotate together. The center is spring-urged toward the forward end relative to the body. The body has a blade adjacent its forward end and a cutting tooth is fixed to the blade. The center has guide jaws adjacent said forward end and the jaws extend radially outwardly toward the forward end, whereby as the body moves toward the forward end relative to the center, the blade slides on the jaws and the tooth moves radially to form the cavity.

5 Claims, 16 Drawing Figures

FIG. 7
FIG. 9
FIG. 8
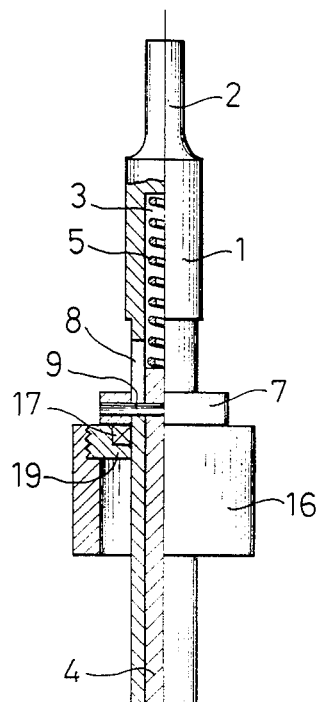
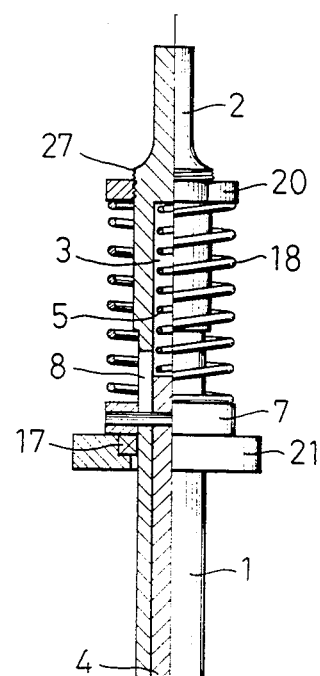
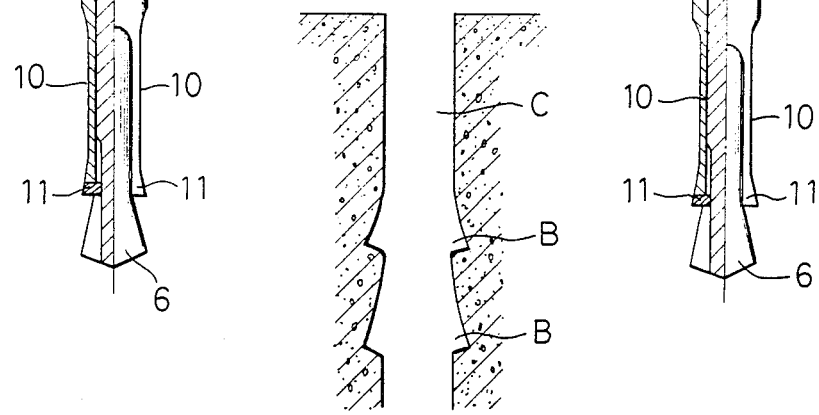

UNDERCUTTING DRILL

FIELD AND BACKGROUND OF THE INVENTION

The present invention relates to a rotary hammer drill for undercutting a hole for an anchor bolt in hardened concrete.

Conventionally, an anchor bolt has been set in hardened concrete by cutting a cylindrical blind hole in the concrete using a hammer drill or the like, inserting the bolt into the hole, and then expanding a split skirt or sleeve of the bolt into frictional engagement with the wall of the cylindrical hole. Recently drills have also been produced which form an undercut or cavity below the surface of the concrete, and anchor bolts which can be expanded into the cavity.

It is a general object of this invention to provide an improved drill for forming an undercut conical or annular cavity in the cylindrical wall of a hole drilled in concrete, whereby an expanded skirt of an anchor bolt extends into and engages the cavity so as to securely hold the bolt in the hole.

SUMMARY OF THE INVENTION

A drill according to the invention includes a body having forward and rearward ends, the body including a generally cylindrical wall formed by an axial bore which is open adjacent its forward end. An axially extending slot is formed through the wall, and a wedge center is mounted axially slidably within the bore. Connecting means is fixed to the center and is axially slidable within the slot, so that the body and center rotate together. The center is spring-urged toward the forward end, so that the connecting means normally engages one end of the slot. The body has at least one blade adjacent the forward end, and a cutting tooth is fixed to each blade. The center has guide surfaces adjacent the forward end and the surfaces diverge radially outwardly toward the forward end, whereby as the body moves toward the forward end relative to the center, the blades slide on the guide surfaces and thereby move the teeth radially outwardly.

BRIEF DESCRIPTION OF THE DRAWINGS

The invention will be better understood from the preferred embodiments of the invention shown in the accompanying figures of the drawings, wherein:

FIG. 7 is a side view similar to FIG. 1 of a drill according to a third embodiment;

FIG. 8 is a cross-sectional view of an undercut hole;

FIG. 9 is a side view similar to FIG. 1 of a drill according to a fourth embodiment;

In the drawings, corresponding parts are indicated by the same reference numerals, and such relative terms as "upper" and "lower" are used only to assist in the description of the structure and should not be considered as limiting its use to any particular orientation during use.

DETAILED DESCRIPTION OF THE DRAWINGS

Figure 1:
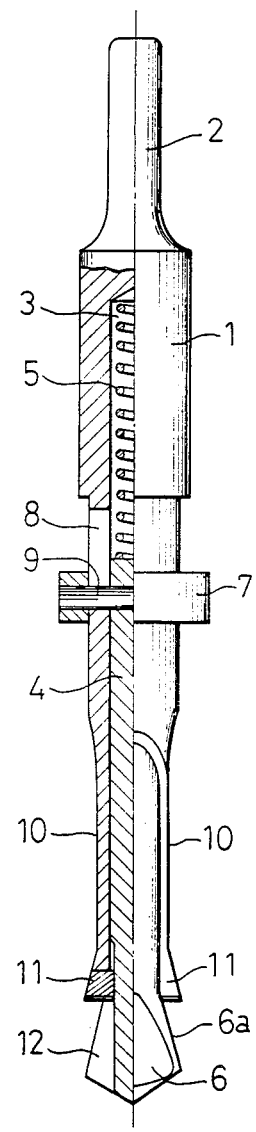
FIG. 1 is a side view partially in cross section of a drill according to a first embodiment of the invention.
Figure 2:
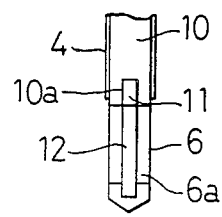
FIG. 2 is a fragmentary side view of the drill in FIG. 1.

The drill in FIGS. 1-2 includes a generally cylindrical body 1 which has a shank 2 formed at its rear or upper end. The shank 2 can be connected to a conventional drive machine (not shown) and driven such that the drill rotates and has an axially vibrating force thereon, in a known manner. The body 1 has an axial center bore 3 which is open at the lower or forward end, and it has oppositely located resilient blades 10 formed at the open end as by machining the body 1. Each blade 10 is arcuate in cross-section and has a cutting tooth 11 at the forward end thereof, each tooth 11 having a cutting edge at the forward end thereof. In this instance, two diametrically opposed blades are provided.

A center 4 extends upwardly into the bore 3 from its lower end and is urged forwardly by a compression spring 5 located between the upper end of the center 4 and the upper end of the bore 3. The center 4 has two pairs of guide jaws 6 (see FIG. 14) formed at the forward end thereof for the blades 10, one pair of the jaws being on each side. Each jaw 6 has an oblique side 6a (FIGS. 1 and 2) diverging toward the forward end. Each pair of jaws 6 form an axial guide groove 12 (FIGS. 1, 2 and 14) therebetween, in which the tooth 11 slidably engages. Each groove 12 is narrower than a blade 10, but the tooth is sized to extend into the groove. As shown in FIG. 2, each blade 10 extends circumferentially on both sides of an associated groove 12. Each tooth 11 is located at the lower center of a blade and extends radially into the associated groove 12 and outwardly beyond the surface of the blade. A slot 10a in the lower end of each blade receives a tooth so that the tooth is supported by the sides of the slot 10a.

The body 1 further has opposite axially extending slots 8 formed through its cylindrical wall above the blades 10. A stop ring 7 is mounted slidably around the body 1 and supported by a pin 9 which extends radially through holes formed in the center 4 and in the ring 7, the pin 9 being slidable in the slots 8 and secured to the center 4.

Thus, the body 1 and center 4 are rotatable together, and the jaws 6 support the teeth 11 because of the engagement between each tooth 11 and the sides of the groove 12 into which the tooth extends, so that a rotational torque is transmitted from the jaws 6 to the teeth 11. Normally, the pin 9 engages the forward ends of the slots 8, so that the teeth 11 are positioned adjacent the rear ends of the oblique guide sides 6a.

Figure 3A:
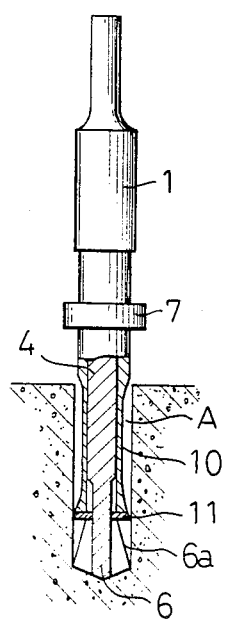
FIGS. 3-4 are views similar to FIG. 1, but illustrate the operation of the drill.
Figure 3B:
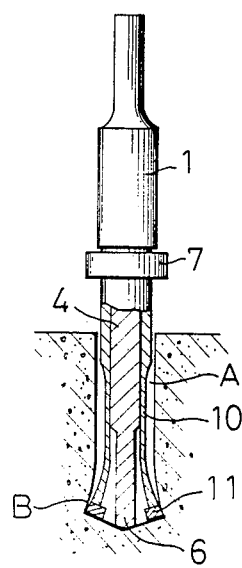
Figure 3C:
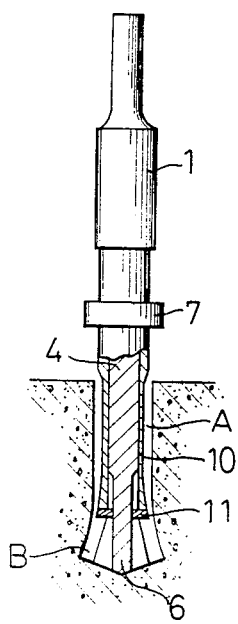

FIGS. 3a-c show an undercutting operation at the bottom of a predrilled blind hole A in a material such as concrete, which is not deeper than the distance between the stop ring 7 and the forward end of the center 4. The forward end of the drill is inserted into the hole A until the forward end of the wedge center 4 reaches the bottom of the hole A (FIG. 3a).

The body 1 is then rotated (the shank 2 being connected to a drive machine) and pushed forwardly against the force of the spring 5. This forces the blades 10 to slide downwardly on and expand radially over the guide sides 6a, until the pin 9 engages the rear ends of the slots 8. The blades 10 are flexible and curve outwardly as shown in FIG. 3b. As a result, the teeth 11 cut a conical cavity in the cylindrical wall of the hole A (FIG. 3b) as the teeth 11 gradually move downwardly.

Pressure on the body 1 is then released and it retracts to the normal position relative to the center 4 due to the action of the spring 5 (FIG. 3c). The drill can then be removed from the hole A.

Figure 4A:
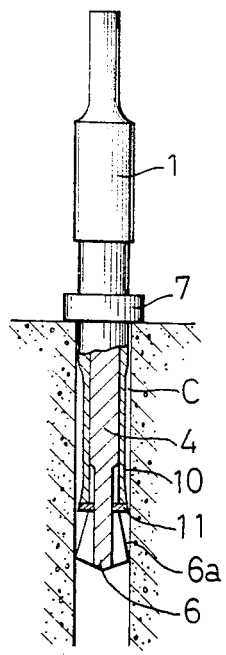
Figure 4B:
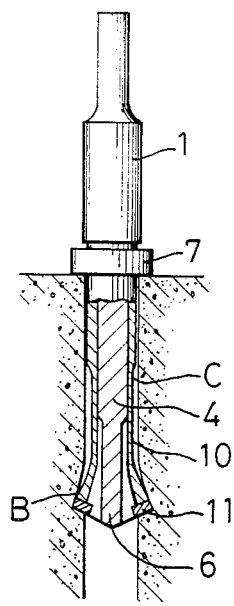
Figure 4C:
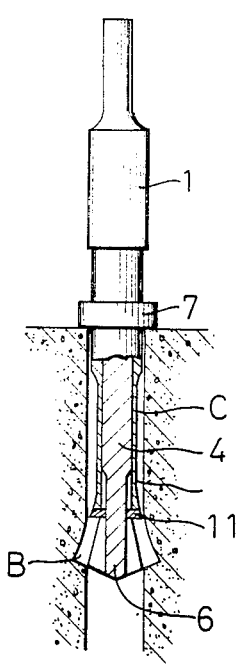

FIGS. 4a-c show an undercutting operation at the middle of a deep hole C. The forward end of the drill is inserted into the hole C until the stop ring 7 engages the surface of the material having the hole C, leaving a space below the center 4 (FIG. 4a). The body 1 is then rotated and pushed forwardly against the force of the spring 5. Similarly with the arrangement shown in FIG. 3b, the teeth 11 cut a conical cavity B in the cylindrical wall of the hole C (FIG. 4b). The body 1 can be retracted (FIG. 4c) in the same manner as shown in FIG. 3c.

In FIGS. 4a-c, it will be noted that the cavity B is cut at a depth corresponding to the distance between the stop ring 7 and the jaws 6.

Figure 6:
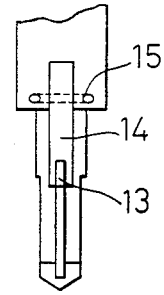
FIG. 6 is a fragmentary side view of the drill in FIG. 5.
Figure 5:
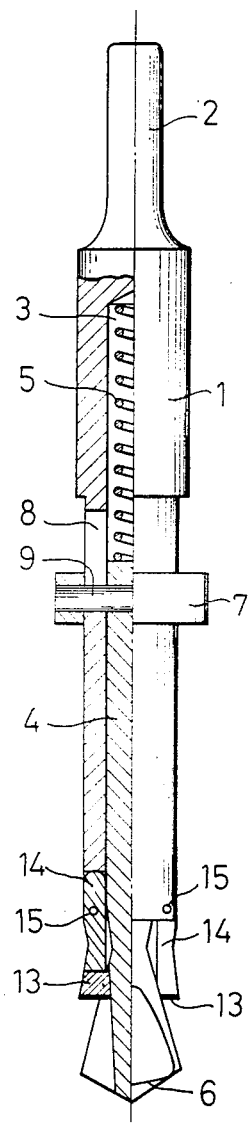
FIG. 5 is a side view similar to FIG. 1 of a drill according to a second embodiment.

The drill shown in FIGS. 5-6 includes a generally cylindrical body 1, which has oppositely disposed blades 14 at its lower end, each blade being supported pivotably at its upper end on the forward end of the body 1 by a pin 15. Each blade 14 has a cutting tooth 13 secured to its forward end, and the teeth 13 can similarly move radially outwardly along the jaws 6 as the body 1 moves downwardly relative to the center 4 and as the blades 14 swing on the pins 15. It is possible to replace the blades 14 by simply removing the pins 15.

The drill shown in FIG. 7 includes a stop ring 7 as shown in FIG. 1, which has a bearing race 19 supported rotatably on the forward end thereof by a ball bearing 17. A cylindrical spacer 16 is threaded on the outer periphery of the race 19 and extends around the body 1, and the lower edge of the spacer 16 engages the surface of concrete around the opening of a hole. The bearing 17 allows for smooth rotation of the drill. By exchanging such spacers 16 having different lengths, cavities B can be cut at different levels in the hole C, as shown in FIG. 8.

The drill shown in FIG. 9 includes a cylindrical body 1 which has an outer thread 27 adjacent its upper end by the shank 2, and a nut 20 engages the thread 27. Another compression spring 18 is mounted around the body 1 between the nut 20 and the stop ring 7, in order to add to the pressure produced by the inner spring 5. For undercutting in soft material, the weight on the body 1 can be balanced by turning the nut 20, so as to facilitate the operation.

The stop ring 7 preferably has a race 21 supported rotatably on the forward end thereof by a bearing 17 so as to engage the surface of the concrete.

Figure 10:
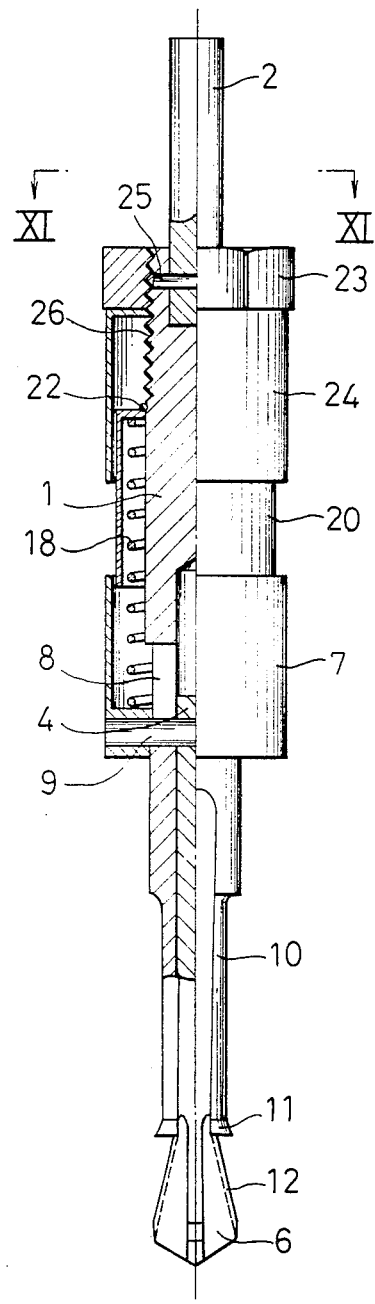
FIG. 10 is a side view similar to FIG. 1 of a drill according to a fifth embodiment.
Figure 11:
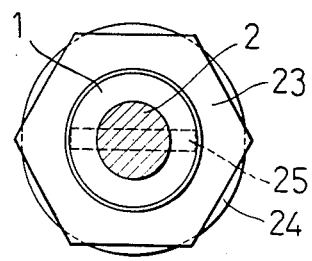
FIG. 11 is a cross-sectional view taken on the line XI—XI in FIG. 10.

The drill shown in FIGS. 10-11 includes a body 1, which has a shank 2 fixed to its upper end by a shear pin 25.

A cup-shaped stop sleeve 7 is supported for axially slidable movement around the body 1 by a pin 9 which slidably extends through the slots 8 in the body 1 and is fixed to the wedge center 4. The sleeve 7 is open at its rear or upper end.

An inverted cup-shaped middle sleeve 20 surrounds the body 1 rearwardly of the stop sleeve 7, and it is retained by a snap ring 22 from sliding rearwardly. This sleeve 20 is open at its forward end, and it has an outer diameter smaller than the inner diameter of the stop sleeve 7. A compression spring 18 extends between and within the sleeves 7 and 20, in order to urge the sleeve 7 and the center 4 forwardly relative to the body 1.

The body 1 has an exterior thread 26 adjacent the rear end thereof. The thread 26 is engaged by a nut 23 which supports a thrust sleeve 24 fixed to the forward end thereof. This sleeve 24 is open at its forward end, and it has the same diameter as the stop sleeve 7.

Figure 12A:
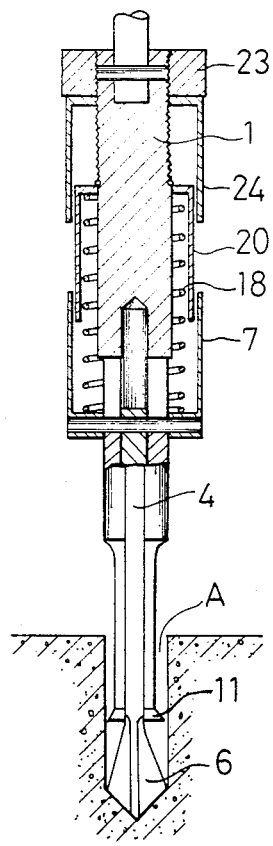
FIG. 12a-c are views similar to FIG. 10, but illustrate the operation of the fifth embodiment.
Figure 12B:
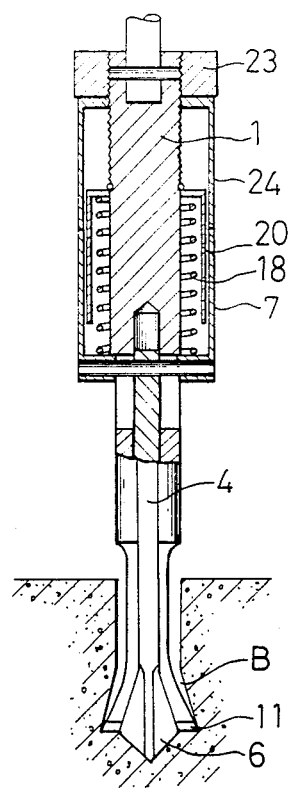
Figure 12C:
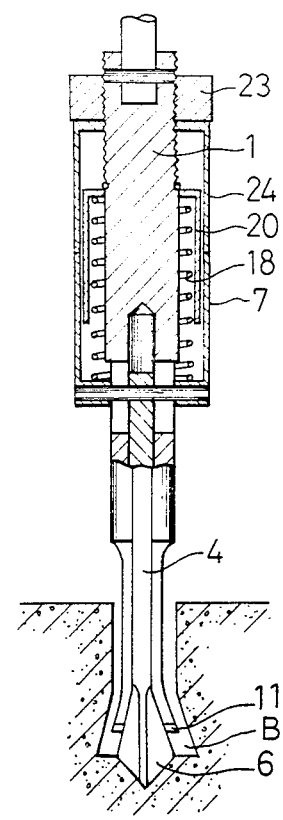

The operation, illustrated in FIGS. 12a-c, is generally the same as the tool shown in FIGS. 3a-c. Normally (FIG. 12a), the thrust sleeve 24 is positioned substantially away from the stop sleeve 7. The body 1 is rotated and pushed so that the thrust sleeve 24 approaches or engages the stop sleeve 7, while a conical cavity B is being cut in a hole A (FIG. 12b).

In this stage, concrete cuttings or shavings accumulate in the hole A, and the cutting teeth 11 may be jammed or locked in the guide grooves 12. Consequently, when the pressure on the body 1 is released, the teeth 11 may not be able to retract due to the force of the spring 18.

In this situation, the nut 23 is threaded downwardly on the body 1 to move the thrust sleeve 24 forwardly so that the body 1 is forced to retract with the teeth 11 (FIG. 12c) relative to the center 4.

Figure 13:
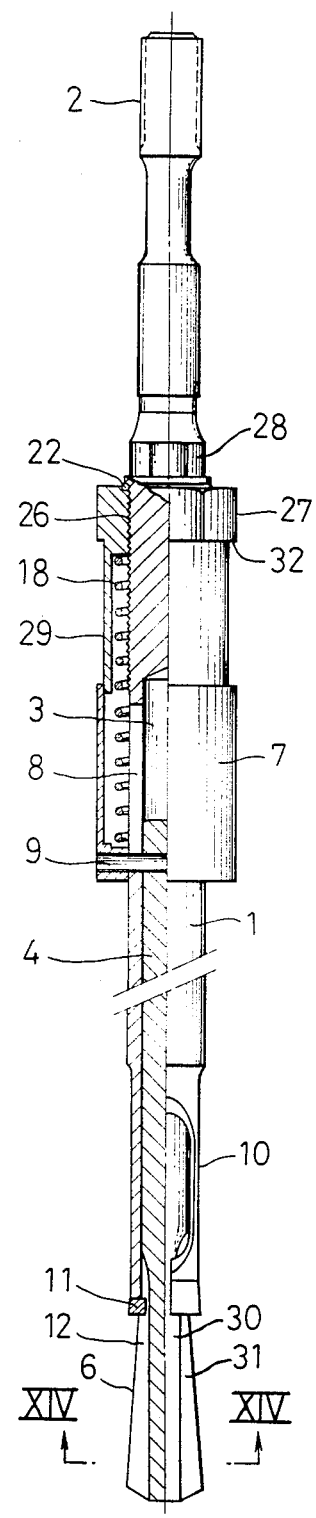
FIG. 13 is a side view similar to FIG. 1 of a drill according to the sixth embodiment.
Figure 14:
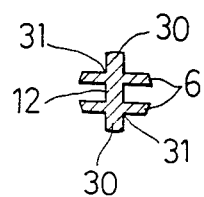
FIG. 14 is a cross-sectional view taken on the line XIV—XIV in FIG. 13.

The drill shown in FIGS. 13-14 includes a body 1 which has flat surfaces 28 adjacent the shank 2, and an outer thread 26 adjacent and forwardly of the surfaces 28. A stop sleeve 7 is mounted in the same manner as shown in FIG. 10.

An internally threaded unlocking nut 27 engages the thread 26 of the body, and is retained by a snap ring 22 from moving rearwardly. The nut 27 has a sleeve 29 which projects forwardly around the body 1 and is open at its forward end. This sleeve 29 has an outer diameter smaller than the inner diameter of the stop sleeve 7, so that these sleeves are in telescopic relation with each other.

A compression spring 18 extends around the body 1 between the bottoms of the sleeve 29 and the stop sleeve 7, in order to urge the center 4 forwardly relative to the body 1. Normally (FIG. 13), the rear end of the sleeve 7 is substantially spaced from the shoulder 32 of the nut 27 adjacent the rear end of the sleeve 29.

In operation, when the rear end of the sleeve 7 contacts the shoulder 32, the undercutting is finished. The shoulder 32 faces forwardly and has the same diameter as the sleeve 7. Similarly to the operation shown in FIG. 12c, the body 1 can be forced to retract relative to the center 4 by turning the screw 27 downwardly on the body 1 after the rear end of the sleeve 7 contacts the shoulder 32. This operation can be done by turning the screw 27 with a wrench or spanner, while the flat surfaces 28 of the body are gripped by another wrench.

The nut 27 can also function to adjust the force of the compression spring 18 and the depth of a conical cavity which will be cut by the drill.

The body 1 also has a pair of bow jaws 30 formed at the forward end thereof, which extend perpendicularly to the guide jaws 6. Each bow jaw 30 also has an outer side which diverges toward the forward end. The bow jaws 30 and guide jaws 6 form spaces or corners 31 therebetween for concrete shavings.

What is claimed is:

1. A rotatable drill having forward and rearward ends, said drill comprising a rotatable body having an axially extending bore forming a generally cylindrical wall, said bore being open adjacent said forward end, an axially extending slot formed through said wall, a wedge center slidably mounted within said bore, connecting means fixed to said center and axially slidably engaging said slot so that said body and said center rotate together, said center being spring-urged toward said forward end relative to said body so that said connecting means is normally adjacent one end of said slot, annular means fixed to said connecting means and axially slidable around said body, and thrust means threaded on said body rearwardly of said annular means and engageable with said annular means, whereby the rotation of said thrust means on said body is operable to force said body to retract toward said rearward end relative to said center, said body having a blade adjacent said forward end, a cutting tooth fixed to said blade, said center having guide jaws adjacent said forward end, said jaws extending radially outwardly toward said forward end, whereby as said body moves toward said forward end relative to said center, said blade slides on said jaws and said tooth moves radially.

2. A drill according to claim 1, wherein said jaws form a guide groove therebetween for slidable engagement with said tooth.

3. A drill according to claim 1, wherein said blade is formed by a resilient portion of said body.

4. A drill according to claim 1, wherein said annular means includes a sleeve which is open adjacent said rearward end, said thrust means including a sleeve which is open adjacent said forward end, said sleeves being movable in telescopic relation with each other, said drill further comprising a compression spring extending between said annular means and said thrust means, so as to urge said center toward said forward end relative to said body.

5. A drill having forward and rearward ends, comprising center guide means having radially outwardly diverging guide surfaces formed thereon, a rotatable body slidably mounted on the outer surface of said center guide means and movable forwardly and rearwardly on said guide means, and said body including radially movable cutting teeth means adjacent said guide surfaces, said cutting teeth means being located to slide along said guide surfaces and thereby be moved radially as said body is moved axially on said center guide means said body having an axially extending bore formed therein, said bore being open at the forward end thereof and said center guide means being slidably mounted within said bore, said guide surfaces being located adjacent the forward end of said body, connecting means between said guide means and said body whereby said guide means rotates with said body, and said guide surfaces including axial guide grooves on the outer side thereof, and said teeth means being axially movable in said guide grooves.

* * * * *